United States Patent [19]

Gerot

[11] Patent Number: 4,535,362
[45] Date of Patent: Aug. 13, 1985

[54] METHOD OF TRANSFERRING DATA IN A TELEVISION RECEIVER

[75] Inventor: Guy J. C. Gerot, Nanterre, France

[73] Assignee: U.S. Philips Corporation, New York, N.Y.

[21] Appl. No.: 465,935

[22] Filed: Feb. 14, 1983

[30] Foreign Application Priority Data

Mar. 24, 1982 [FR] France .................................. 82 05009

[51] Int. Cl.³ .............................................. H04N 5/44
[52] U.S. Cl. .................................................. 358/194.1
[58] Field of Search ..................... 358/194.1, 191.1; 455/177, 179, 185, 200; 340/789, 791, 793, 825.06, 825.71, 825.57

[56] References Cited

U.S. PATENT DOCUMENTS 4,231,031 10/1980 Crowther .......................... 358/194.1
4,482,247 11/1984 Zato .................................. 358/194.1

FOREIGN PATENT DOCUMENTS 2006559 5/1979 United Kingdom .

Primary Examiner—Tommy P. Chin
Attorney, Agent, or Firm—Thomas A. Briody; William J. Streeter; Edward W. Goodman

[57] ABSTRACT

Among the connections in a television receiver, the connections which convey control, setting or display messages are very numerous. All these connections can be reduced to one single connection by transferring digitally encoded messages which are repeated or changed within each field, each message being subjected to a time shift which is accurately determined relative to the field retrace pulse (14) and the line retrace pulses (13) and has a duration of a fixed number of line period intervals.

4 Claims, 7 Drawing Figures

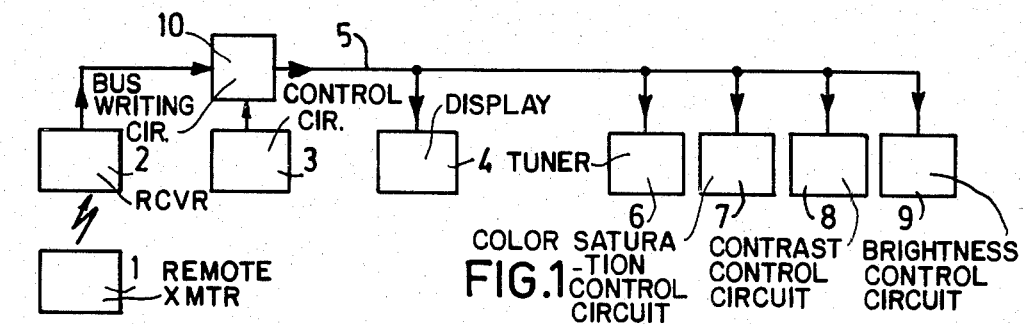
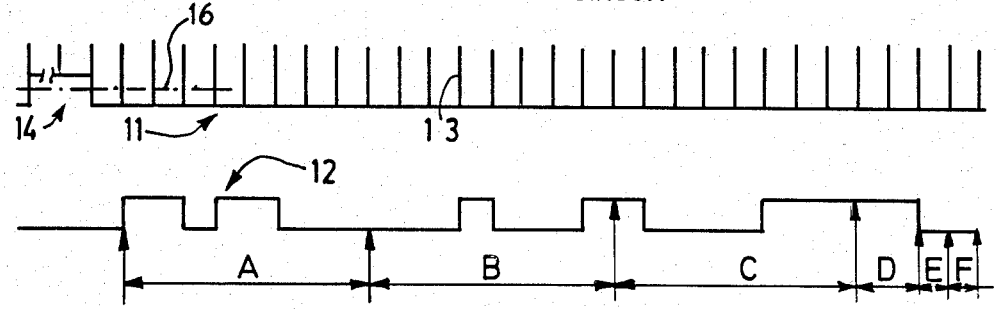
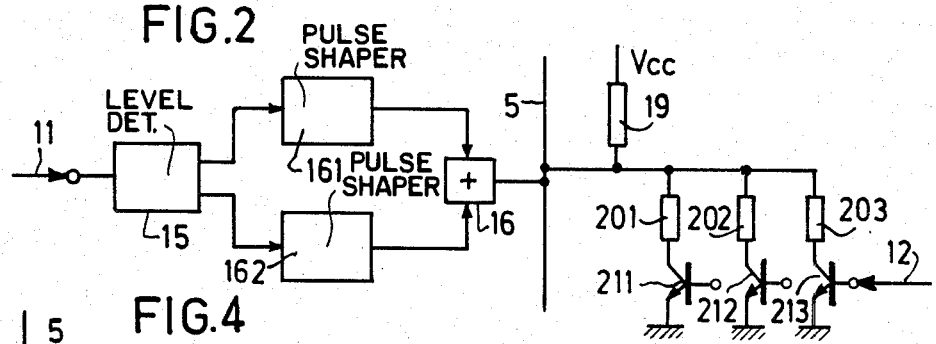
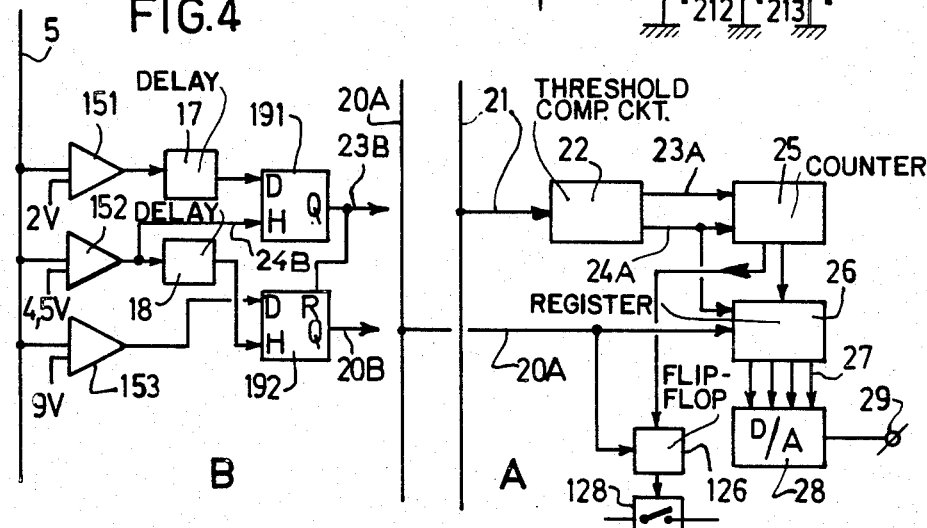

METHOD OF TRANSFERRING DATA IN A TELEVISION RECEIVER

BACKGROUND OF THE INVENTION

The invention relates to a method for use in a control system for transferring messages from a control means to several circuits to be controlled, these messages being digitally encoded and being transferred serially over a line.

The invention also relates to a television receiver, for use of the method in accordance with the invention. In such a TV-receiver control or switching data are transferred in digitally encoded form from control means available to the user to television receiver circuits to be controlled. The control means are, for example, the control knobs for brightness, contrast, sound volume or knobs for switching tapes and standards, for switching from black-and-white to color or from mono to stereo etc. Generally, these control elements are concentrated in the what is commonly referred to as the control panel. The circuits to be controlled are distributed over the receiver and the transfer of the commands requires a large number of special connecting lines. It is expensive to provide all these lines separately and they are difficult to repair. In order to reduce this number of lines, U.K. patent specification No. 2,006,559 proposes a control system in which control element is connected to an encoding circuit via a matrix, this encoding circuit being connected to a microprocessor which itself is connected to the circuit to be controlled via a first multi-wire line, the so-called data bus, and a second multiwire line, the so-called address bus.

SUMMARY OF THE INVENTION

It is an object of the invention to provide a further decrease in the number of lines; a further object of the invention is to avoid the use of a microprocessor.

According to the invention, all the messages to be transferred are assembled to form a fixed sequence having a fixed number of bits, at least one bit of each message coinciding with a line retrace pulse, the ordinal number of this line retrace pulse defining the control circuit to which the relevant message must be applied, while all the bits of the sequence occur in a time interval located between two consecutive field synchronizing pulses.

This method has the advantage that no special clock is required for the control of the digital transfer.

A television receiver in accordance with the invention is characterized in that each control circuit or group of control circuits comprises a circuit for recognizing one or more predetermined line retrace pulses, so that only at predetermined instants may the transferred bits be conveyed to the relevant control circuit. The presence of an address bus is then not necessary, which saves expensive wiring between the different circuits.

DESCRIPTION OF THE DRAWINGS

The invention will now be further described by way of example with reference to the accompanying drawings.

FIG. 1 shows a simplified block diagram of the components used for putting the method of the invention into effect.

FIG. 2 shows a what is commonly referred to as a "sandcastle" signal and a data signal.

FIG. 4 shows a circuit arrangement for generating the signal of FIG. 3.

FIG. 5 shows a block diagram of a "receiver" included in each of the circuits to be controlled.

DESCRIPTION OF THE PREFERRED EMBODIMENT

Figure 3:
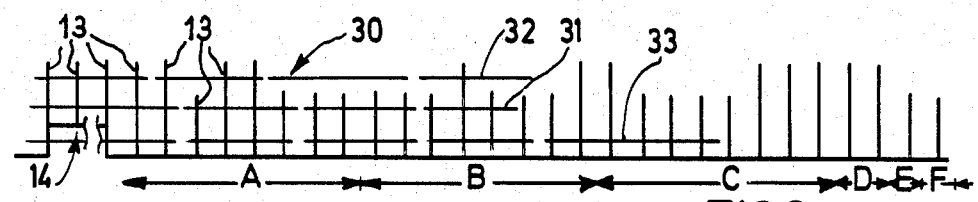
FIG. 3 shows a signal comprising both messages and synchronizing signals.

FIG. 1 shows components of a television receiver whose control and switching messages are transferred in digital form from a control circuit 3, which the user has at its disposal, to the circuits 6, 7, 8, 9 to be controlled.

The components 1 and 2 represent a remote control transmitter and an associated receiver, respectively, the combination 1-2 consequently having a function which is comparable to the function of the control circuit 3, which combination may be formed by potentiometers and/or switches arranged on the television receivers itself. The means and methods used for encoding, transferring, and decoding the remote control commands are conventional means and the methods and are not part of the invention.

The circuits 6, 7, 8, 9 represent, for example, a tuner, a colour saturation control circuit, a contrast control circuit, a brightness control circuit or an audio-volume control circuit.

The single-wire line 5 serially conveys the messages from the control circuits ½ and 3 to the circuits 6, 7, 8, 9, to be controlled.

Component 10 represents a bus writing device which converts the data supplied in parallel by the arrangements 2 and 3 into a sequence of messages.

The component 4 represents a display by means of which a visible indication is given to the user of the station the receiver is tuned to or to which of the circuits 6, 7, 8, 9 message is applied at a given moment.

According to the invention, the messages to be transferred from the control circuit ½ or 3 to the different control circuits 6, 7, 8, 9 are digitally encoded and applied sequentially to the line 5. All the messages together form a fixed sequence comprising a fixed number of bits. At least one bit of each message coincides with a line retrace pulse and all the bits of the sequence occur in a time interval located between two consecutive field synchronizing pulses. The ordinal number of the line retrace pulse with which the relevant bit of a message coincides, defines the control circuit to be controlled by said message.

To accomplish synchronization with the field signals and knowledge about the ordinal number of each line, a signal, which is commonly referred to as a "sandcastle" signal, is preferably used. This signal, which is shown at 11 in FIG. 2 has a porch 14 of an average height (for example 2.5 volts) during the field retrace period; in addition, it comprises pulses 13 which correspond to the line retrace pulses and have a given level, for example 4.5 volts.

The digitally encoded and sequentially supplied messages to be transferred are shown at 12. The first message starts at, for example, the first line retrace pulse after a field retrace. The ordinal number of the line retrace pulse 13 indicates the meaning of each bit. More specifically, each bit of the message is synchronized with a line retrace pulse. It should be noted that after each line retrace pulse it is alternatively possible to transfer a number of bits which are all associated with the same message. For example, in the signal 12 the bits 0 to 7, inclusive, which are denoted by A and here represent the number 11011000 represent a control value A which is applied to, for example, the audio-volume control circuit, the bits 8 to 15, inclusive which are denoted by B and here represent the number 00010001 are, for example, applied to a treble control circuit etc. Those messages which consist of only one or two bits may be placed at the end of the message sequence. The message D shown in FIG. 2 and comprising two bits may represent a standard indication (SECAM, PAL, NTSC...), and the one-bit messages E, F may represent the positions of the switches, such as mono/stereo.

The "sandcastle" signal 11 shown in FIG. 2 is present in the majority of sub-assemblies of a television receiver, so that between such a sub-assembly and the bus writing arrangement 10 only one single wire need be provided which then has for its sole object to convey the signal 12. However, the signal 11 is usually not applied to some of the sub-assemblies (for example the audiosections). In those case it is advantageous if the single line 5 which conveys the messages, could additionally be used to convey the line and field synchronizing pulses. A signal which contains both the message and said synchronizing pulses is shown in FIG. 3 and is denoted by reference numeral 30. Reference numeral 14 denotes the field retrace pulse which has a voltage level of, for example, 3 volts. During the field retrace pulse the line flyback signals 13 remain visible, as they have a voltage level of, for example, 12 volts. During the transfer of the data signal these line retrace pulses reach different voltage levels depending on whether the transfer bit is "1" or "0". They have, for example, a voltage level of 12 V for a "1" and a level of 6 V for a "0". The line retrace pulses can be distinguished by comparing the signal 30 with a threshold 31 of, for example, 4.5 V. The data signals can be distinguished by comparing them with a threshold 32 of, for example 9 V and the line and field retrace pulses can be distinguished by comparing them with a threshold 33 of, for example 2 V.

The circuit diagram of FIG. 4 show how the signal 30 of FIG. 3 can be generated, starting from the two signals 11 and 12 indicated in FIG. 2. The signal 11 is applied to a level detector 15 which separates the field and line synchronizing pulses and conveys them to the pulse shaping circuits 161 and 162, respectively. Finally, they are added together in the circuit 16 and applied to the wire 5. This circuit supplies from its output two signal levels which produce two voltage levels in the resistor 19. The data signal 12 controls a transistor 213 which causes the voltage at the wire 5 to decrease in a ratio which is determined by the resistors 19 and 203. The data signal can be fed into the line 5 in several different points, which is indicated by the presence of the other transistors 211 and 212 and the other resistors 201 and 202. Each of these transistor conducts when a "1"-bit is applied to it and is cut-off when a "0" bit is applied to it. By arranging the circuits 161 and 162 and 16 in such a position that the field and line retrace pulses are separately available, the level detector 15 may be omitted. This is possible as each of the components or group of components [161, 162, 16], [19], [211, 201], [212, 202], [213, 203] can be connected to any point on the wire 5.

In the following description it will be described how a "receiver" of a control system can be implemented; how a control by means of +/− keys can be realized and how a control by means of potentiometers can be realized.

FIG. 5 shows a receiver for use in each of the circuits to be controlled. The wires 20A and 21 carry the signals 12 and 11 (of FIG. 2), respectively. Hence, the signal 11 is applied to the component 22. In this component a comparison with the threshold voltage T (FIG. 2) produces a signal at the end of the field flyback porch, which signal is conveyed to the element 25 via the wire 23A.

A comparison is also effected in the element 22, with a higher voltage than the field retrace porch, for example, 3.5 V and this element applies the line retrace pulses to the component 25 over the wire 24 A.

The component 25 comprises a counter which is started by a pulse on the wire 23A, this counter counting the pulses on the wire 24A. Let it be assumed that 256 bits are consecutively conveyed over the wire 20A (signal 12, FIG. 2), it will then be necessary to use a counter which is provided by 7 consecutive divide-by-two dividers. At a given instant the seven outputs of these divide-by-two dividers produce a 7-bit number. The digital comparison of this number with a predetermined number gives an indication whether the conveyed message is addressed or not addressed to the relevant control circuit. Let it be assumed that this control circuit is associated with an audio amplifier and that it has for its object to adjust the volume and that the message consists of eight bits which are transferred after or during the line retrace pulses having the ordinal number 64 to 71, inclusive. All these messages have the left-hand portion 1000XXX in common. The three X's indicate that the three right-hand bits may have any value, while the above-mentioned digital comparison consists of checking whether the four left-hand bits are 1000. If so, an enable signal is applied to the register 26 in response to which this register records at the rate of the line retrace pulses (supplied by the wire 24A) the bits conveyed over the wire 20A. If the counting position becomes equal to "72", that is to say 1001000, the enable signal disappears and the counter is stopped, as a result of which the contents of the register 26 corresponds to the bits conveyed after the line retrace pulses 64 to 71, inclusive. These bits are continuously applied to the digital-to-analog converter 28 which produces an analog control quantity at the terminal 29. The same control circuit can also receive a one-bit message (for example: mono/stereo). The counting position of the counter included in the component 25 will now be compared with a different word, consisting of 7 bits, so that for a predetermined counting position the notion "mono" or "stereo" is assigned to the bit present on the line 20A. This bit is stored in a flip-flop 126 which control a switching contact 128.

At B in FIG. 5, receiver for the circuits to be controlled is shown by means of which the data signal 12 and the signal 11 of FIG. 2 can be reconverted when these signals are conveyed together over one line 5 in the manner shown in FIG. 3. Three comparison circuits 151, 152, 153 which have 2 V, 4.5 V and 9 V thresholds, respectively, are connected to the wire 5. The signal received from the comparison circuit 151 is delayed in the circuit 17, for example by means of two consecutive inverting gates and are applied to the data input D of D-flip-flop 191. The clock input H of this flip-flop 191 is energized by the output signal from the comparison circuit 152. At the output 23B the signal has a high level during the field retrace pulse and a low level during the remaining portion of the time. The comparison circuit 152 produces the line retrace pulse which are delayed in the circuit 18, which is similar to the circuit 17, and are applied to the clock input H of a second D-flip-flop 192 whose data input D is connected to the output of the comparison circuit 153 and the reset input R to the output 23B. The output signal 20B has a value zero during the field retrace pulses and is equal to the data signal 12 (of FIG. 2) during the remaining portion of the time.

The signals 20B, 23B, 24B from this circuit can be fed into the respective connections 20A, 23A, 24A at A in FIG. 5, the circuit 22 then being superfluous.

As regards the "transmitter" of the control system, two cases can be distinguished. In the first case push-buttons are used in the remote control circuit 1 and the analog functions are set by operating "+" and "−" push-buttons. In contrast therewith, a control circuit 3 arranged on the television set may comprise potentiometers which mechanically maintain an adjusted position.

Figure 6:
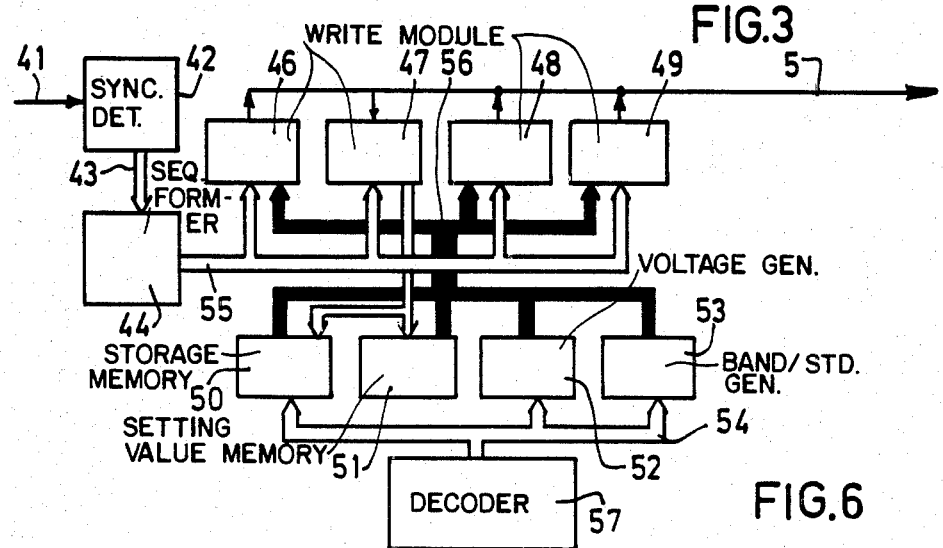
FIG. 6 shows a block diagram of a "transmitter" for a control system.

FIG. 6 shows how a push-button control circuit can be implemented. The example relates to the setting and selecting of programs. The circuit comprises a keyboard 58, a decoding element 57, a setting value memory 51, a storage memory 50, a varicap voltage generator 52, a band and standard generator 53, write modules 46 to 49, inclusive for line 5, a synchronization detection element 42 and a sequence former 44. The components 42 to 56, inclusive form a portion of the block 10 of FIG. 1 (a different portion being formed by the components of FIG. 7).

The keyboard 58 and the decoder elements 57 are realized in a conventional way. The keyboard 58 may be positioned on the television receiver. The message to be effected at a given instant occurs at the output of the decoding element 57 on the bus line 54, which transfers both addresses and data. This message which is only temporarily present on the bus line 54 is stored in one of the elements 50, 52, 53. This is a further known property of the arrangements of this type.

At a given moment the buffer memory 50 contains the data of the program: the number of programs, the varicap tuning voltage the band and the standard.

The memory 51 stores permanently the data of each program, namely the number of the program, the associated varicap tuning voltage, the band and the standard.

By means of the two memories 50 and 51, it is possible to change, temporarily, the setting of the current program without affecting the program stored in the memory 51. If so desired the values contained in memory 50 can be stored definitely in the memory 51. At any moment, it is alternatively possible to substitute the value present in the memory 51 by the values present in memory 50. These two operations are effected via the data wire 5. The memories 50 and 51 can namely each "write" on this wire 5 via the modules 46, 48, 49 and each can "read" from this wire 5 via the module 47.

The unit 52 is used for manual or automatic adjustment. It comprises an adder/subtractor whose counting position is increased or decreased by operating a +/− key of the keyboard 58 and which thus changes the varicap voltage. This voltage is written on the wire 5 by means of the module 48. The increase or the decrease of the counting position is controlled by a pulse generator, not shown, which is used as a clock for the adder/subtractor and whose rate of operation depends on the information supplied to the keyboard by the user.

The unit 53 comprises also a counter which is incremented one step when the user pushes a key which has for its object to change the standard. A further comparable arrangement is used to change the band.

The tuning voltage can be indicated by 12 bits (4096 different values), the band and the standard by 2+2 bits, the number of the program by 4 bits (for 16 programs). The bus line 56 is comprised of a total of 20 wires, which all lead to the memory 50, 16 wires (12+2+2) lead to the memory 51, twelve wires lead to the generator 52 and 4 wires (so 2+2) lead to the generator 53. At the other end of the bus line 56, four wires lead to the module 46 for writing the program number, twelve wires lead to the module 48 for writing the varicap voltage and 4 wires lead to the module 49 for writing the standard and the band. It should be noted that the bus lines 54, 55, 56 are included in the integrated circuit, which means that there is no wiring in the television receiver. As the so-called "sandcastle" signal is applied via input 41 to the element 42, this element 42 separating the line retrace pulses and the field retrace pulses from the sandcastle signal and applying them to sequence former 44 via the connection 43. This sequence former 44 comprises a line pulse counter which is reset to zero by the field pulse. These functions are comparable to the functions of units 22 and 25, which were described in the foregoing with reference to FIG. 5. Comparing the result of the digital comparison of the number of counted line retrace pulses with a predetermined number, determines which of the modules 46 to 49, inclusive, must be rendered operative and when. Each of these modules is provided by a parallel in-series out shift register. They each received in parallel via the bus line 56 the information to be transferred and convey it serially over the line 5 at a rate of 1 bit per field scanning line from a starting moment determined by the sequence former 44. Hence, this sequence former 44 applies clock pulses to each of the registers 46 to 49, inclusive via the bus line 55, a sequence of pulses being applied to a register during a predetermined period. This is effected by means of gates which authorize the application of the line pulses to either the register 46 or the register 49, depending on an authorization produced by the result of the comparison of the number of counted line retrace pulses with different predetermined numbers which each correspond to one of the relevant registers.

Simultaneously with the clock pulses, the sequence former 44 applies a signal which authorizes the transfer of a message via the line 5 to one of the modules 46 to 49, inclusive, this specific module then being chosen. In the presence of that signal, the output of each of the modules 46 to 49, inclusive, on the line 5 is in a what is commonly referred to as a high impedance state.

Figure 7:
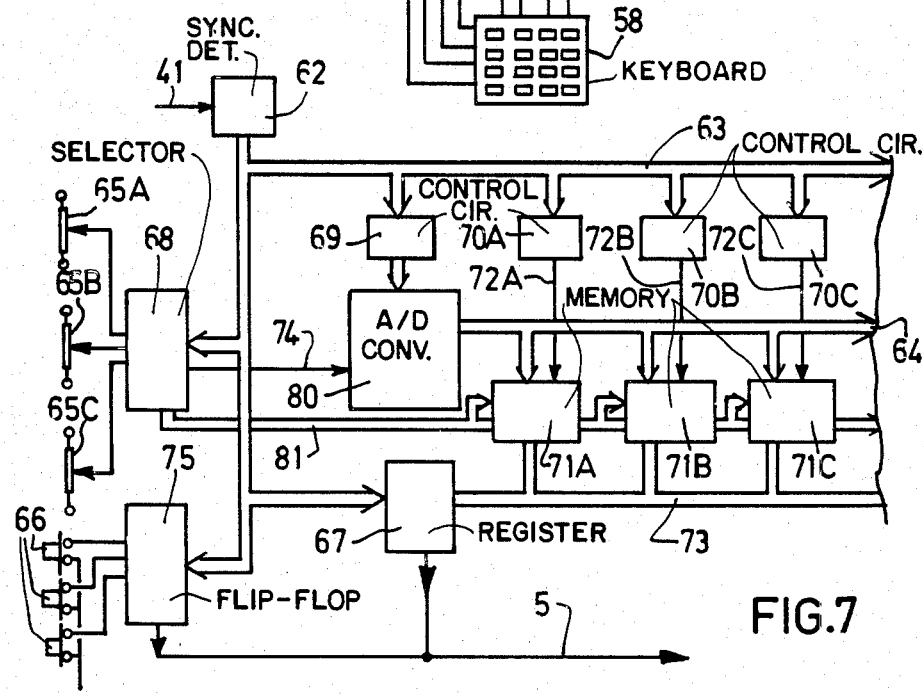
FIG. 7 shows a block diagram of a different implementation of a "transmitter" for a control system.

FIG. 7 shows how a control on the basis of potentiometers and mechanical push-buttons can be realized. Reference numeral 65 denotes trimming potentiometers, reference 66 denotes mechanical circuit breaker push-buttons. The positions of all the potentiometers 65 and all these circuit breakers 66 is checked, for example once in each picture, which is amply sufficient. The component 75, which directly writes on the line 5, comprises a circuit breaker flip-flop unit, in this example formed by three flip-flops. The sandcastle signal is applied via input 41 to the component 62 which distributes the line and field pulses over the bus line 63. The component 75 is enabled when the addressing by the bus 63 corresponds to its address: When the desired line number has been reached a bit which corresponds to the position of the circuit breaker 66 is conveyed over the line 5 by connecting the output of the corresponding flip-flop to the line 5.

In a similar way, the component 68 connects each of the sliding contacts of the potentiometers 65 to the input wire 74 of an analogue-to-digital converter 80 by means of the analog circuit breaker. The result of this conversion is immmediately conveyed to the memories 71 by the bus 64.

All the memories are checked for each picture. The desired memory is selected by a message conveyed over the bus 81 by the component 68 and is induced to write by a message supplied by the converter 80 when the conversion has ended. The conversion command is given at the desired instant of each picture by the component 69. By comparing the result of the current present on the bus 63 with a predetermined number, each component 70 controls the connection at the desired instant of each memory 71, via the bus 63, to the register 67, which then serially transfers the content thereof over the line 5, at a rate of 1 bit per picture line. The busses 63, 64, 81 are here also included in the integrated circuit.

What is claimed is:

1. A method for use in a control system of a television receiver for transferring messages from a control circuit to several circuits to be controlled, said television receiver generating a sequence of line retrace pulses and field synchronizing pulses as timing signals for said control system, said messages being digitally encoded and being transferred serially over a single-wire line, characterized in that said method comprises the steps:
   detecting said sequence of line retrace pulses and field synchronizing pulses;
   digitally encoding said messages such that in each encoded message at least one bit thereof is significant and defines which one of said several circuits is to be controlled thereby; and
   forming a sequence from said encoded messages having a fixed number of significant bits which all occur in a time interval located between two consecutive field synchronizing pulses in said sequence of line retrace pulses and field synchronization pulses, said messages being arranged in said sequence such that the significant bits therein correspond ordinally with the line retrace pulses in said sequence of line retrace pulses and field synchronizin pulses.

2. A method as claimed in claim 1, characterized in that in said sequence forming step, each bit in said sequence of encoded messages in transferred on the occurrence of each line retrace pulse.

3. A television receiver having a control system for transferring messages from a control circuit to several circuits to be controlled, said television receiver having means for generating a sequence of line retrace pulses and field synchronizing pulses as timing signals for said control system, said messages being digitally encoded and transferred serially over a single wire line, characterized in that said control system comprises:
   means for detecting said sequence of line retrace pulses and field synchronizing pulses;
   means for digitally encoding said messages into bits such that in each encoded message, at least one of said bits is significant and defines which of said several circuits is to be controlled; and
   means for forming a sequence from said encoded messages having a fixed number of significant bits which all occur in a time interval between the occurrence of two consective field synchronizing pulses in said detected sequence of line retrace pulses and field synchronizing pulses, said messages being arranged in said sequence such that the significant bits therein corresponds ordinally with the line retrace pulses in said detected sequence of line retrace pulses and field synchronizing pulses.

4. A television receiver having a control system as claimed in claim 3, characterized in that in said sequence forming means, each bit in said sequence of encoded messages is transferred on the occurrence of each line retrace pulse.

* * * * *